United States Patent [19]

Vance, Sr.

[11] 3,911,755

[45] Oct. 14, 1975

[54] FLAT BELT

[75] Inventor: James C. Vance, Sr., Sedalia, Colo.

[73] Assignee: The Gates Rubber Company, Denver, Colo.

[22] Filed: Oct. 17, 1974

[21] Appl. No.: 515,728

[52] U.S. Cl. .............. 74/231 R; 74/231 P; 74/232
[51] Int. Cl.² ...................... F16G 1/00; F16G 1/26
[58] Field of Search ............ 74/231 R, 231 P, 232

[56] References Cited
UNITED STATES PATENTS

| | | | |
|---|---|---|---|
| 3,076,736 | 2/1963 | McHugh | 74/232 X |
| 3,212,627 | 10/1965 | Beebee | 74/232 |
| 3,221,869 | 12/1965 | Paasche | 74/232 X |

Primary Examiner—John J. Camby
Attorney, Agent, or Firm—H. W. Oberg, Jr.; Raymond Fink; Curtis H. Castleman, Jr.

[57] ABSTRACT

A flat power transmission belt capable of transmitting power from oppositely facing driving portions, the belt including a tensile section of two oppositely twisted cords spiralled side-by-side and embedded cross-cords or other reinforcement disposed to have a force resolution at an angle opposite that of the lead of the spiralled cords.

7 Claims, 4 Drawing Figures

FLAT BELT

BACKGROUND OF THE INVENTION

The invention relates to machine elements and mechanisms, but more particularly, the invention relates to laminated belts with plural driving surfaces.

Crowned pulleys have long been used as a means for solving tracking problems intrinsically associated with flat belts. Belt tracking is affected by planar and angular misalignment of pulleys used in a belt drive assembly, and dynamic forces resultant from the physical arrangement of reinforcements embedded in the belt. While crowned pulleys have long proved their capability in helping to solve belt tracking problems, there is always a limit to their capability. Any improvements made in solving problems associated with dynamic forces generated by embedded reinforcements in the belt improves the effectiveness of crowned pulleys in solving tracking problems associated with planar and angular misalignment of the belt drive assembly. When this is done, the flat belt drive assembly becomes more economically practical for use in areas such as front end drives on automobiles where larger alignment tolerances may be desirable. In some drives, such as a backside drive, belt tracking stability must be inherent for an operable system.

It has been determined that a belt will tend to track in a direction of the lead of a spiralled tensile cord embedded therein and also in accordance with the direction of cord twist. Prior art solutions include oppositely spiralling oppositely twisted cords from the center to the edges of a belt. A problem with such a solution is that the starting point for both of the spirals must be located near the center of the belt. Otherwise, the belt will not properly track. Also, when crowned pulleys are used, one-half of the belt may have a spiral cord with cord twist that is operating in an unfavorable tracking condition because the portion of the belt with the reverse spiral is not in contact with the pulley. Should such a belt be used on a reverse drive where pulleys are close together and one pulley is misaligned, the influence of one spiral cord may more than offset the centering capability of the crowned pulleys as the belt is reversely bent between pulleys.

Other prior art flat belts are not adaptable to backside drive situations because of asymmetry between both the inner and outer portions of the belt. Such asymmetry causes the belt to track improperly over the pulleys.

Accordingly, this invention is primarily directed to solving tracking instability problems of a flat belt — especially a backside drive flat belt.

SUMMARY OF THE INVENTION

In accordance with the invention, a backside drive belt is provided which has very little, if any, intrinsic dynamic force unbalance due to embedded reinforcements. The belt has a tensile section of at least two generally oppositely twisted cords spiralled side-by-side near the mid portion of the belt. Preferably, cross-cords are embedded in the belt at an angle generally opposite that of the spiral and less than ninety degrees in relation to the longitudinal axis of the belt. The oppositely twisted cords balance intrinsic torques caused by cord twist while angled cross-cords, or a reinforcement with and angled force resolution, balance the tracking effect of the spiral. The cross-cords are symmetrically placed on either side of the tensile section so that the belt will properly track on oppositely facing driving portions or surfaces.

An object of the invention is to provide a belt which longitudinally tracks with very little, if any, side forces as varying friction loads are applied to oppositely facing driving portions of the belt in a backside belt drive assembly.

Another object of the invention is to provide a backside belt drive assembly with a belt which is dynamically stable as various frictional loads are applied to opposite sides of the belt.

Still another object to the invention is to provide a long wearing backside drive flat belt which has minimum thickness.

Yet another object to the invention is to provide a flat belt having minimum slippage at high tension ratios.

These and other objects or advantages of the invention will be apparent after reviewing the drawing and description thereof wherein.

DESCRIPTION OF PREFERRED EMBODIMENTS

Figure 1:
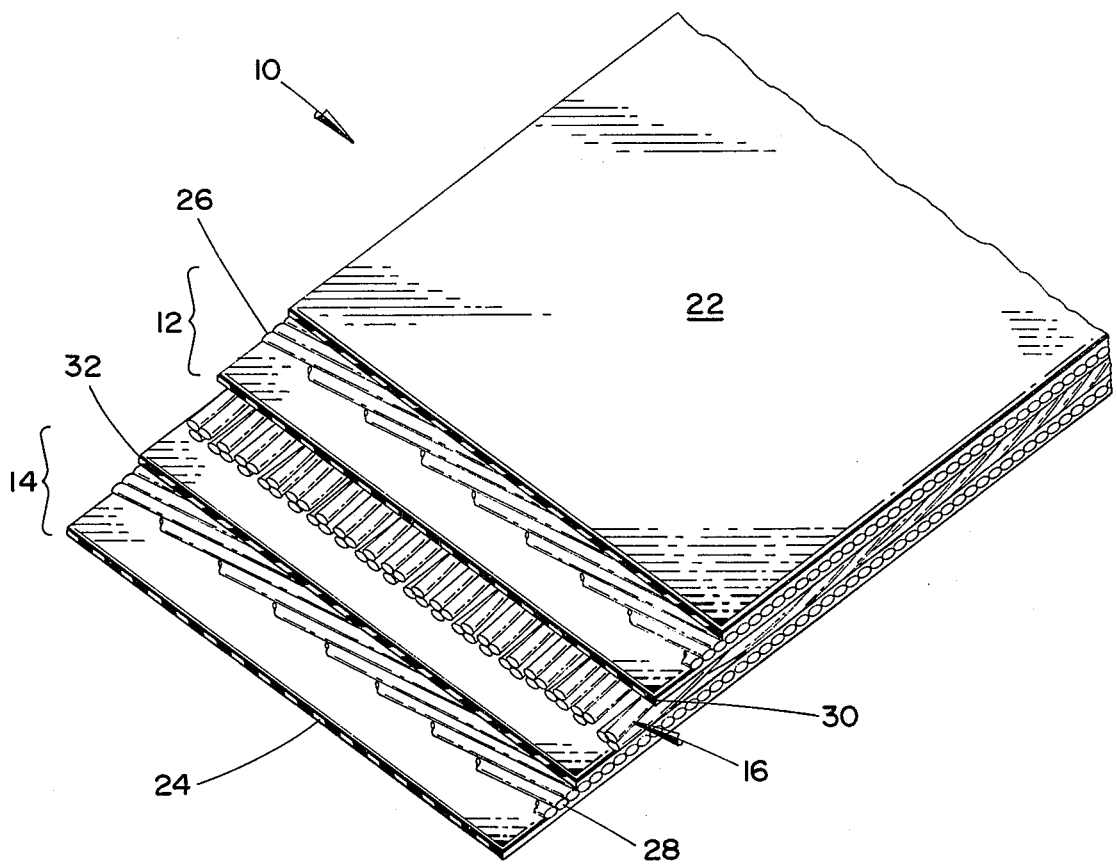
FIG. 1 is an isometric cutaway view of a portion of the flat belt showing the various layers of the belt.
Figure 2:
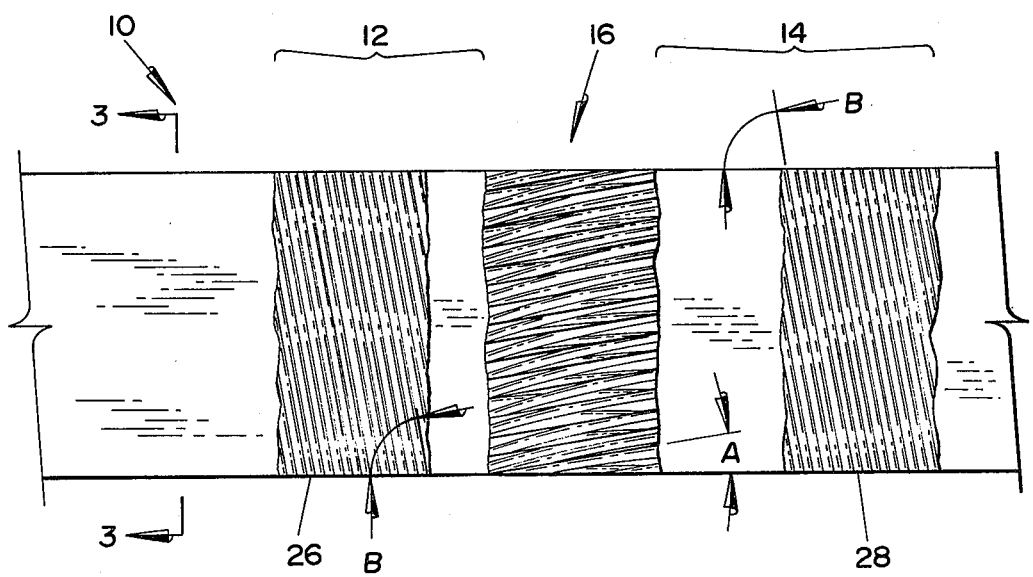
FIG. 2 is a top cutaway view of the belt showing angular relationships of the reinforcements.
Figure 3:
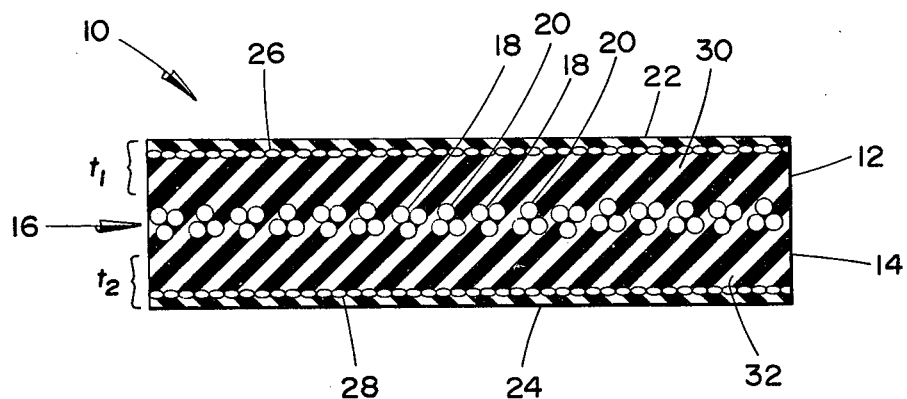
FIG. 3 is a cross-sectional view taken along the lines 3—3 of FIG. 2.

Referring to FIGS. 1 through 3, a backside drive flat belt 10 is provided which has first 12 and second 14 layers of flexible resilient material extending longitudinally of the belt. This flexible material is of the polymeric type normally used in flexible belt manufacture and may be of such materials as the natural rubbers, synthetic rubbers, or blends thereof, or may be of a plastic type material.

A tensile section 16 of high modulus material is embedded in the belt disposed between the first and second layer. The tensile section is of the spiral type and extends longitudinally of the belt at a small spiral or helical angle. Of course, the angle is influenced by the circumference of the belt and the diameter or gauge of the cords 18, 20. Any of the several typical materials may be used for the cords such as nylon, rayon, polyester, steel, glass, or aramid.

The cords are of typical twist construction where the smallest element is a filament, staple filament, or staple fiber. Staple filaments or fibers must be twisted to form a thread or yarn whereas a plurality of filaments may be used as an untwisted yarn. In either case, a plurality of threads or yarns may be twisted either clockwise or counter-clockwise which is known in the art as "Z" or "S" respectively. A plurality of, for example, Z yarns may then be twisted together in a reversed or S direction. Then, these composites or bundles are twisted together in the opposite or desired direction to establish a balanced cord. The cords may be plied in various twist combinations so that a balanced cord is achieved that will not freely untwist when cut. Any combination of twisting may be used to achieve a desired cord balance. Cord twist is a determinative factor in defining the fatigue endurance and circumferential growth of a final belt product. Oppositely twisted cords may be readily produced which have essentially the same fatigue and growth resistance. For the purpose of this disclosure, the term "oppositely twisted cords" is used to define those cords of substantially the same construction except for the direction of twist throughout construction of the entire cord. Thus, the final twist of a cord may be S or Z and the internal construction of the cord may be S or Z but will be opposite for each cord. In other words, the cords are "left hand" or "right hand".

It is known in the art that when a twisted cord, even though it includes oppositely twisted composite elements, is placed in a belt and tensioned, the final or outermost twist to the cord has an affect on the tracking of the belt around a pulley. The twist will cause the belt to tend to track right or left depending on the direction of final twist. Also, the amount of tension in a cord has an affect on the degree of tracking, left or right, which a belt will exhibit.

At least two oppositely twisted cords 18, 20 are spiralled side-by-side at substantially the same angle A in relation to the longitudinal axis of the belt. By placing two cords side-by-side in the tensile section, each has an opposite influence on tracking at varying tensile loads. Thus, the oppositely twisted cords balance out each others dynamic tension affect on tracking when the belt transmits power in a belt drive assembly.

The first 12 and second 14 layers of flexible material are substantially of the same thickness $t_1$, $t_2$ so the tensile section 16 is located substantially at the mid-point of the belt. The substantially equal thickness layers define substantially similar oppositely facing driving portions 22, 24 at the exterior belt surfaces. Preferably, substantially equally spaced cross-cords 26, 28 are disposed at substantially the same angle B and are embedded at substantially the same relative position in the first and second layers. The cross-cords 26 are disposed at an angle B less than ninety but generally greater than 75° in relation to the longitudinal axis of the belt. The angle is opposite but not equal to that of the spiral angle.

The cross-cords may again be of any desired material such as above-discussed for the tensile section, or in the form of cord fabric. However, it is preferred that the cords be of smaller gauge or diameter. For example, the gauge may be generally half that of the tensile cord. Cord fabric is preferred because the net force resolution of the cords is along the axis of the cords at the angle B.

Preferably, the cross-cords are positioned next to the driving portions 22, 24 of the belt and the spacing between cross-cords is at least half of the diameter of the cross-cords for reasons which will later be explained. Also, the diameter of the cross-cords is less than half the thickness of the respective layer in which they are embedded.

The cross-cords are disposed in the belt at the "bias angle" B to offset the dynamic "off-tracking" affect of the spiral of the oppositely twisted cords.

The reinforcement outermost or nearest the driving portions of the belt has the greatest influence on tracking. Hence, the cross-cords are disposed near the surface for maximum effect. The off-tracking caused by the spiral of the oppositely twisted cords is somewhat reduced because of the thickness of the first and second layers. The generally unreinforced polymeric portions 30, 32 cushion the tensile section and somewhat reduce their influence on tracking.

To further illustrate the belt of the invention, two 1100 denier polyester yarns of zero twist were twisted together at four turns per inch in the Z direction. Three of the Z twisted bundles were then oppositely twisted in the S direction at 2.0 turns per inch to give a composite cord construction of O (zero twist 1100 denier yarn), Z (two 1100 denier yarns twisted together in the Z direction), and S (three Z bundles twisted in the opposite or S direction). Similarly, an oppositely twisted cord of O S Z construction was then made. The cords had a final denier of 6600 and a diameter of 0.050 inch. The thickness of the first and second layers was 0.035 inch. Of the first and second layers, 0.018 inch gauge was occupied by the cross-cords 26, 28, disposed in the first and second layers near the driving portions 22, 24. The spacing or thickness of the generally unreinfoced polymeric portions 30, 32 were approximately equal to the cross-cords 26, 28 diameters or 0.018 inches. The cords were disposed at an angle B of substantially eighty degrees in relation to the longitudinal axis of the belt.

Figure 4:
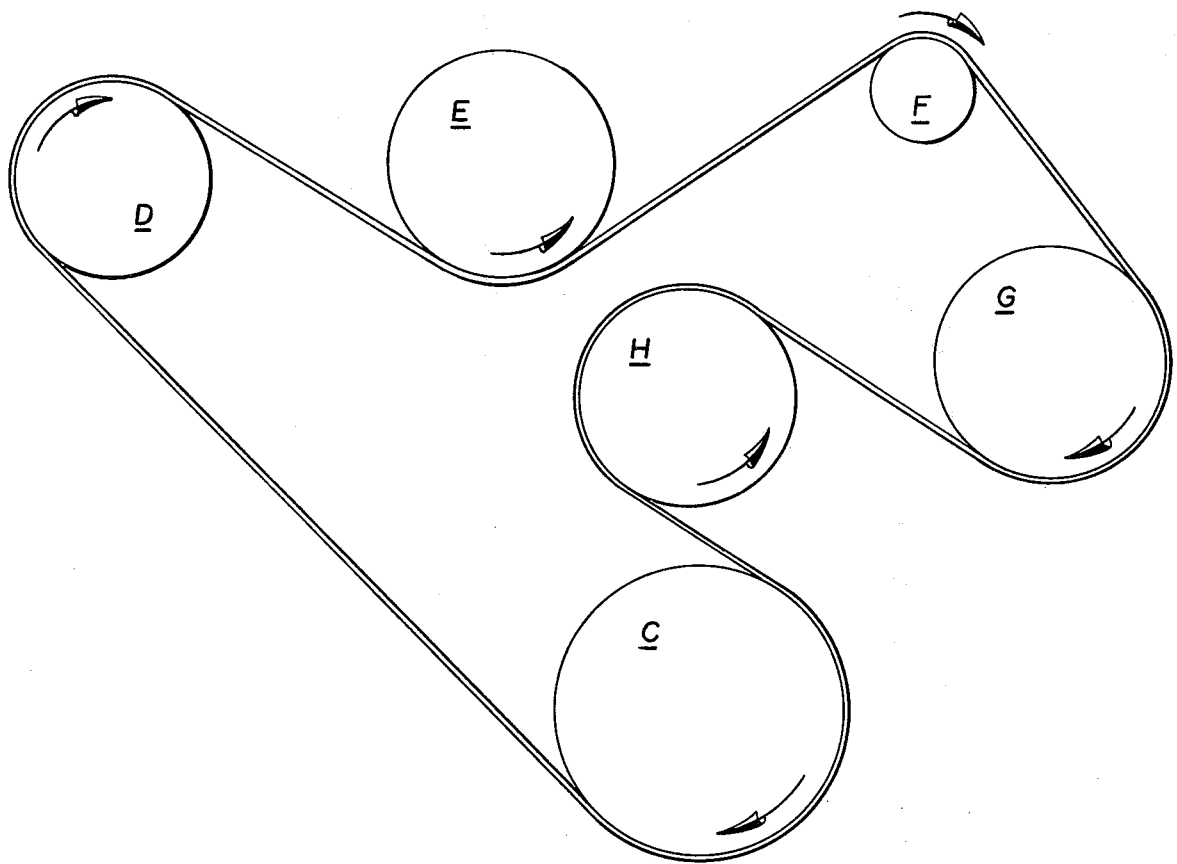
FIG. 4 is an end view of a backside belt drive assembly.

In operation, the belt is trained around several crowned pulleys of a drive assembly such that both driving portions of the belt are actively used such as shown in FIG. 4. The pulley diameters pulley speed, horsepower loads, are listed in the following table.

TABLE

| Pulley | Diameter in. | Pulley Speed rpm | Horsepower |
|---|---|---|---|
| C (driver) | 7.79 | 600 – 4,500 | |
| D | 5.00 | 930 – 7,000 | 0 – 12 |
| E | 6.22 | 750 – 5,600 | .25 – 3.5 |
| F | 2.62 | 1,790 – 13,400 | 2.0 – 4.5 |
| G | 6.10 | 760 – 5,750 | 2.5 – 3.0 |
| H | 5.60 | 830 – 6,250 | .1 – 17 |

The belt was then operated and found not to off-track either right or left as various load changes such as increased belt speed, variable torques, etc. were applied to both sides of the belt. The flat belt was able to transmit power for several hours without any appreciable wear and at unexpectedly high frictional loads with very little slip. It is theorized the long life and frictional characteristics results as the belt is flexed around the pulleys. Through flexing, flexible material between the spaced cross-cords is pushed out between the cords to affect several or a plurality of driving surfaces which enhance friction and inhibit wear.

Additional Species

In the above embodiment, cross-cords are used to balance the off-tracking effect of the spiralled tensile cords. Cross-cords per se do not have to be used to balance to the effect of the spiralled tensile section. Other tensile reinforcements such as square woven fabric, may be used provided that the warp and fill threads of the fabric are oriented in the layers at an angle such that they have a net force resolution on tracking which is opposite that of the spiral. The net force resolution of the reinforcement is at an angle (i.e., B) in relation to the belt when the reinforcement is tensioned along the longitudinal axis of the belt. For example, square woven fabric may be placed in the layers so the effect of the warp and fill cords are not symmetrical at 45 degrees in relation to the longitudinal axis of the belt. Rather, the warp may be placed at 5 degrees with the fill at 35 degrees giving a net force resolution of 80 degrees. Similarly, pantographed fabric such as disclosed in U.S. Pat. No. 2,519,590 may be used. When this is done, the fabric is oriented unsymmetrically to achieve a net force resolution that is opposite from that of the spiralled twist section.

The foregoing detailed description is for the purpose of illustration only and it is not intended to limit the scope of the invention which is established by the appended claims.

What is claimed is:

1. A flexible power transmission generally flat belt capable of driving from opposite portions thereof to transmit power between pulleys, the belt comprising:

a flat layer of flexible resilient material extending longitudinally of the belt to define a first driving portion thereof and including a plurality of substantially uniformly spaced cross-cords embedded therein and transversely disposed at a first angle in relation to the longitudinal axis of the belt;

a second layer of flexible material spaced from, substantially parallel with, and having a thickness substantially equal to the first layer to define a second driving portion oppositely facing from the first driving portion and including a plurality of substantially uniformly spaced cross-cords embedded therein and transversely disposed at substantially the first angle from the transverse axis of the belt;

a tensile section of high modulus material embedded in the belt between the first and second layers, the tensile section including at least two oppositely twisted cords spiralled side-by-side at a second angle in relation to the longitudinal axis of the belt, the first and second angles oppositely facing from each other;

the two oppositely twisted cords substantially balancing each others intrinsic torque from cord twist when tensioned, and the cross-cords substantially balancing the intrinsic tracking affect of the spiralled cords at the first and second driving portions.

2. The belt as set forth in claim 1 wherein the cross-cords are disposed at an angle less than 90° and greater than about 75°.

3. The belt as set forth in claim 1 wherein the spacing between cross-cords is greater than one-half the diameter of the cross-cords.

4. The belt as set forth in claim 1 wherein the diameter of the cross-cords is less than one-half the diameter of the oppositely twisted cords.

5. The belt as set forth in claim 1 wherein the cross-cords are disposed substantially next to the first and second driving portions.

6. The belt as set forth in claim 5 wherein the cross-cords comprise less than half the thickness of their respective first and second layers.

7. A flexible power transmission generally flat belt capable of driving from opposite portions thereof to transmit power between pulleys, the belt comprising:

a flat layer of flexible resilient material extending longitudinally of the belt to define a first driving portion thereof and including a testile reinforcement embedded therein, the textile reinforcement having a net force resolution at a first angle in relation to the longitudinal axis of the belt when tensioned along a line parallel to the longitudinal axis of the belt;

a second layer of flexible material spaced from, substantially parallel with, and having a thickness substantially equal to the first layer to define a second driving portion oppositely facing from the first driving portion and including a second textile reinforcement embedded therein, the second textile reinforcement having a net force resolution at substantially the first angle when tensioned along a line parallel to the longitudinal axis of the belt;

a tensile section of high modulus material embedded in the belt between the first and second layers, the tensile section including at least two oppositely twisted cords spiralled side-by-side at a second angle in relation to the longitudinal axis of the belt, the first and second angles oppositely facing from each other;

the two oppositely twisted cords substantially balancing each others intrinsic torque from cord twist when tensioned, and the first and second textile reinforcements substantially balancing the intrinsic tracking affect of the spiralled cords at the first and second driving portions.

* * * * *